May 16, 1961  M. N. HUFFMAN  2,984,677
ETHERS OF 1,3,5,16-ESTRATETRAEN-3-OL
Filed Dec. 3, 1957
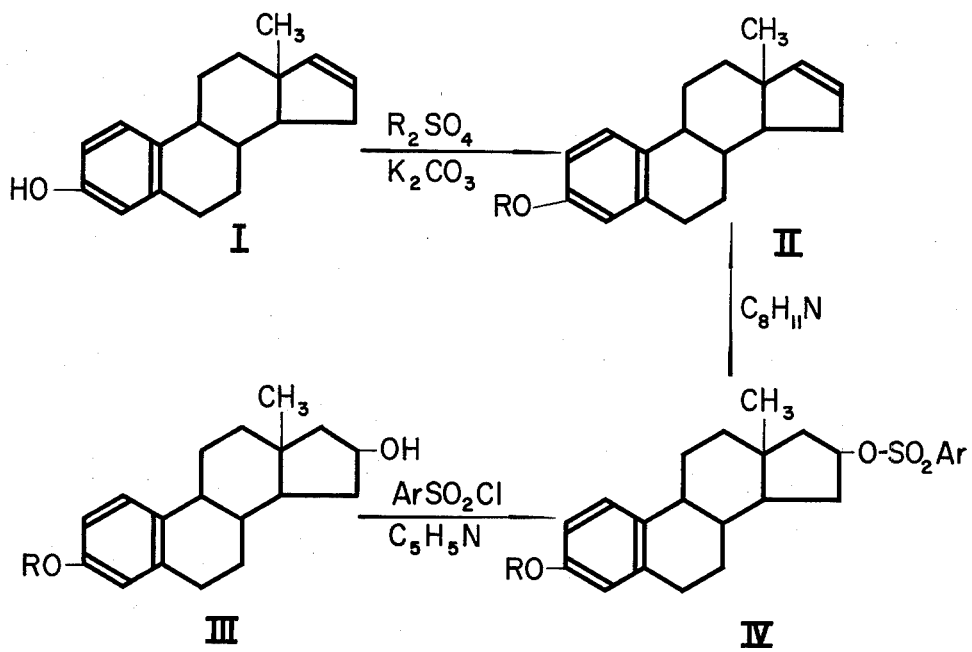
INVENTOR.
MAX N. HUFFMAN
BY
ATTORNEYS

United States Patent Office 2,984,677
Patented May 16, 1961

2,984,677

ETHERS OF 1,3,5,16-ESTRATETRAEN-3-OL

Max N. Huffman, Oklahoma City, Okla., assignor to Lasdon Foundation, Inc., Yonkers, N.Y., a corporation of Delaware Filed Dec. 3, 1957, Ser. No. 700,462

3 Claims. (Cl. 260—397.5)

This invention relates to ethers of 1,3,5,16-estratetraen-3-ol and to the production thereof. More particularly, this invention relates to steroid compounds having the following general formula:

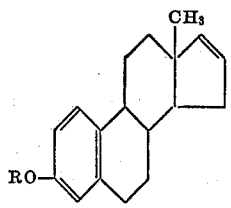

wherein R is a hydrocarbon radical containing 1 to 7 carbon atoms, inclusive.

The compounds of this invention are valuable medicinal agents in the treatment of abnormal conditions of the heart. In particular, they protect against ventricular fibrillation and auricular-ventricular dissociation in laboratory studies. While these substances are derived from the estrogens, they are not estrogenic in dosages which are effective in the treatment of abnormal heart conditions. In this respect, they appear to be useful medicinal agents without adverse side effects.

It is the object of this invention to provide new ethers of 1,3,5,16-estratetraen-3-ol, as well as methods of producing such ethers. It is a further object of this invention to provide new and useful steroid compounds which exhibit beneficial properties in abnormal heart conditions. These and other objects will be apparent from and are achieved in accordance with the following description of the invention taken in connection with the attached drawing.

The accompanying single sheet of drawing constitutes two process diagrams, both illustrating methods of synthesizing ethers of 1,3,5,16-estratetraen-3-ol (II). In the first process diagram the starting material is 1,3,5,16-estratetraen-3-ol (I) and in the other process diagram the starting material is 3-methoxy-1,3,5-estratrien-16-beta-ol or similar 3-ether (III). The respective starting materails used in producing the compounds of this invention are well known in the prior art and do not constitute any part of this invention.

Referring to the first process diagram in which the procedure from I to II is shown, the process comprises converting 1,3,5,16-estratetraen-3-ol (I) into its corresponding 3-ether (II) by reacting I with a dialkyl sulfate in the presence of potassium carbonate or similar alkali metal carbonate in a solvent medium comprising water and a lower alcohol corresponding to the alkyl sulfate. By this procedure the hydroxyl group in the 3-position of I is etherified with the production of II.

The second process diagram illustrated on the single sheet of drawing comprises the steps employed in going from compound III to compound IV to compound II. The initial step of this method comprises the esterification of estradiol-3,16-beta-3-alkyl ether (III) to an ester of an aromatic sulfonic acid (IV) by treatment of III with an aromatic sulfonyl halide in an acid-binding organic solvent such as a tertiary organic amine such as pyridine, quinoline, or dimethylaniline. The aromatic sulfonyl halide, such as p-toluenesulfonyl chloride, reacts with the free hydroxyl group in the 16-position of III with formation of an aromatic sulfonic acid ester represented by IV. This ester is then heated with a relatively high boiling tertiary amine (preferably above 100° C.) such as collidine, to eliminate the elements of aromatic sulfonic acid with the formation of a double bond at the 16-position of the steroid. In this fashion the ester represented by IV is converted to the unsaturated ether represented by II. Besides collidine in the conversion of IV to II, other high boiling tertiary organic amines can be used, such as quinoline, dimethylaniline, lutidine and the like. The quantity of tertiary organic amine is selected so that it is stoichiometrically equal to or greater than the quantity of aromatic sulfonic acid to be eliminated, and generally many fold the theoretical quantity in order also to provide solvent for the elimination reaction.

In the compounds of this invention represented by the general formula given above, the radical R may represent any of the lower hydrocarbon radicals, such as a lower alkyl radical including ethyl, methyl, propyl, butyl and the like, and may include aralkyl radicals, such as benzyl, as well as alkenyl radicals, such as allyl and crotyl radicals. All such compounds are made in the procedures illustrated above except that when alkenyl or aralkyl radicals are to be introduced, the corresponding alkenyl or aralkyl halides, such as allyl bromide, crotyl bromide, benzyl chloride or benzyl bromide, are used in the etherification reaction represented by the first process diagram. Likewise, in the second process diagram the corresponding alkenyl or aralkyl ethers of estradiol-3,16-beta are used as starting materials in the process.

The invention is disclosed in further detail by the following examples which are provided for the purpose of illustration only and are not intended to limit the invention in scope. Quantities of materials are given in grams and milligrams and volumes are indicated in milliliters, while temperatures are recorded in degrees centigrade.

EXAMPLE 1

*3-methoxy-1,3,5,16-estratetraene.*—A mixture of 220 milligrams of 1,3,5,16-estratetraen-3-ol, 2.2 grams of anhydrous potassium carbonate and 22 milliliters of 90% aqueous methanol was heated on a steam bath until the steroid dissolved. Then 0.22 ml. of dimethyl sulfate was added. After the initial reaction subsided, 1.6 ml. of dimethyl sulfate were added in three portions with agitation after each addition. Then the mixture was refluxed for 60 minutes and diluted with 35 ml. of water. The reaction mixture was refrigerated for about 15 hours and then extracted twice with 100-ml. portions of petroleum ether. The combined extracts were washed with 100 ml. of 0.5 N potassium hydroxide solution and then with water until neutral. The petroleum ether extract was then evaporated to dryness on a steam bath and the residue was crystallized from 85% aqueous methanol. The crystalline 3-methoxy-1,3,5,16-estratetraene was washed with 40% aqueous methanol and dried at 35° C. The yield was 170 milligrams of product melting at 68° C.

EXAMPLE 2

*3-methoxy-1,3,5,16-estratetraene.*—Was also prepared by an alternative method by the following procedure starting with estradiol-3,16-beta-3-methyl ether: 750 milligrams of estradiol-3,16-beta-3-methyl ether in 15 ml. of dry pyridine were treated with 2.5 grams of p-toluenesulfonyl chloride at room temperature. After about 15 hours the reaction mixture was diluted with 300 ml. of ice water and refrigerated. The precipitate of estradiol-3,16-beta-3-methyl ether-16-p-toluenesulfonate was collected on a filter, washed well with water and dried. The dried product was refluxed for 4 hours in 90 ml. of collidine in an oil bath at 190–200° C. in a system protected from the atmospheric moisture. The reaction solution was then cooled and mixed with 1,500 ml. of ether and 1,000 ml. of cold 0.7 N sulfuric acid. The ether phase was partitioned and washed with two 1,000-ml. portions of 0.7 N sulfuric acid, with 1,000 ml. of cold 3% sodium bicarbonate solution and with two 1,000-ml. portions of ice water. The ether was evaporated and the residue amounting to 610 milligrams was dried and dissolved in 100 ml. of 80% aqueous methanol containing sufficient sodium hydroxide to form a 0.5 N solution. The solution was refluxed for 1 hour to saponify any unremoved p-toluenesulfonic acid ester. It was then evaporated until crystallization began, cooled and refrigerated. The precipitate of 3-methoxy-1,3,5,16-estratetraene was collected on a filter, washed with water and dried.

In order to remove any hydroxylated steroid the product was heated for 1 hour on a steam bath with 0.5 gram of succinic anhydride in 4 ml. of dry pyridine in a system protected from atmospheric moisture. The reaction solution was mixed with 200 ml. of 1.0 N hydrochloric acid and 500 ml. of ether, and the ether layer was separated, washed with 100 ml. of 1.0 N hydrochloric acid, with 200 ml. of ice water, 200 ml. of 0.1 N potassium carbonate solution and twice with 200-ml. portions of ice water. The ether solution was then evaporated, yielding 560 milligrams of 3-methoxy-1,3,5,16-estratetraene. On further recrystallization from 80% aqueous methanol, there was obtained 425 mg. of this substance melting at 68–69° C.

EXAMPLE 3

*3-ethoxy-1,3,5,16-estratetraene.*—300 milligrams of 1,3,5,16-estratetraen-3-ol were dissolved in 30 ml. of 90% aqueous ethanol. Then 4.5 grams of anhydrous potassium carbonate were added and the mixture refluxed for 10 minutes. Then diethyl sulfate was added in four 0.72-ml. portions and the mixture was refluxed 45 minutes after each addition. Finally the reaction mixture was diluted with 70 ml. of water and left for 15 hours at −15° C. The precipitate of 3-ethoxy-1,3,5,16-estratetraene was collected on a filter and washed well with water and dried in vacuum. The product was dissolved in 44 ml. of methanol, treated with activated charcoal and filtered while hot. 11 ml. of 1 N sodium hydroxide and 30 ml. of methanol were added and the solution refrigerated at −15° C. for 15 hours. The precipitate of 3-ethoxy-1,3,5-16-estratetraene was removed by filtration and dried in vacuum. The product weighed 250 mg. and melted at 49–50° C. On recrystallization from 85% methanol, the product had the same melting point.

What is claimed as new and is desired to be obtained by Letters Patent of the United States is:

1. A compound of the formula

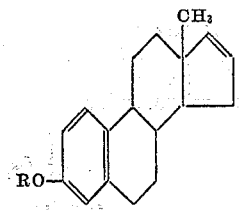

wherein R is a radical selected from the group consisting of methyl and ethyl radicals.

2. 3-methoxy-1,3,5,16-estratetraene.
3. 3-ethoxy-1,3,5,16-estratetraene.

References Cited in the file of this patent

UNITED STATES PATENTS

| | | |
|---|---|---|
| 2,201,121 | Butenandt | May 14, 1940 |
| 2,705,239 | Huffman | Mar. 29, 1955 |
| 2,714,112 | Miescher et al. | July 26, 1955 |
| 2,730,525 | Hogg | Jan. 10, 1956 |
| 2,853,501 | Hoehn et al. | Sept. 23, 1958 |
| 2,855,413 | Mueller | Oct. 7, 1958 |
| 2,861,086 | Jiu | Nov. 18, 1958 |
| 2,874,173 | Hogg et al. | Feb. 17, 1959 |
| 2,906,758 | Kincl et al. | Sept. 29, 1959 |

OTHER REFERENCES

Prelog et al.: Helv. Chim. Acta, vol. 28, pages 250–6 (1945).